United States Patent [19]

Terracol et al.

[11] Patent Number: 5,062,525
[45] Date of Patent: Nov. 5, 1991

[54] PRODUCTION MACHINE INCORPORATIONG A HIGH-SPEED LIFT AND CARRY DEVICE WITH DOUBLE WALKING BEAM, AND THE PRODUCTION SYSTEM IMPLEMENTING THIS TYPE OF MACHINE

[75] Inventors: Claude Terracol, Eybens; Patrick Bredel, St. Martin D'Heres; Jean-Laurent Guillet, Eybens, all of France

[73] Assignee: Merlin Gerin, Meylan, France

[21] Appl. No.: 587,355

[22] Filed: Sep. 24, 1990

[30] Foreign Application Priority Data

Sep. 22, 1989 [FR] France ............................ 89 12558

[51] Int. Cl.⁵ ............................................ B65G 27/34
[52] U.S. Cl. ............................... 198/468.6; 198/465.2
[58] Field of Search .............. 198/465.1, 465.2, 609, 198/468.6, 832.1, 773

[56] References Cited

U.S. PATENT DOCUMENTS

| | | | |
|---|---|---|---|
| 2,943,726 | 7/1960 | Granath | 198/832.1 |
| 2,969,750 | 1/1961 | Clark | 198/468.6 X |
| 3,571,892 | 3/1971 | Levy | 198/832.1 X |
| 3,584,730 | 6/1971 | Elineau | 198/468.6 |
| 3,850,213 | 11/1974 | Keaton | 198/832.1 X |
| 4,029,215 | 6/1977 | Birdwell | 198/468.6 X |
| 4,432,450 | 2/1984 | Dorigo | 198/832.1 X |
| 4,813,529 | 3/1989 | Kawai et al. | 198/468.6 |
| 4,823,933 | 4/1989 | Hashimoto et al. | 198/468.6 X |

FOREIGN PATENT DOCUMENTS

| | | | |
|---|---|---|---|
| 0286546 | 10/1988 | European Pat. Off. | |
| 3333993 | 3/1984 | Fed. Rep. of Germany . | |
| 2192960 | 2/1974 | France . | |
| 0071741 | 5/1982 | Japan | 198/465.2 |
| 0145718 | 9/1982 | Japan | 198/468.6 |
| 63-62624 | 3/1988 | Japan . | |
| 63-272435 | 11/1988 | Japan . | |
| 1089016 | 4/1984 | U.S.S.R. | 198/468.6 |
| 2195596 | 4/1988 | United Kingdom . | |

OTHER PUBLICATIONS

*Tooling & Production*, "Special Transfer Lines Add Speed to Precision Application", vol. 45 (1979) Aug. No. 5.
*Tooling & Production*, "Transaxle Transfer Line", vol. 43, No. 12 (1978).

Primary Examiner—D. Glenn Dayoan
Attorney, Agent, or Firm—Parkhurst Wendel & Rossi

[57] ABSTRACT

A production machine equipped with two walking beam lift and carry devices forming two parallel tracks, a main track and a branch track. Transfer of a part from the branch track to the main track is achieved by a handling unit synchronized with the walking beam.

9 Claims, 5 Drawing Sheets

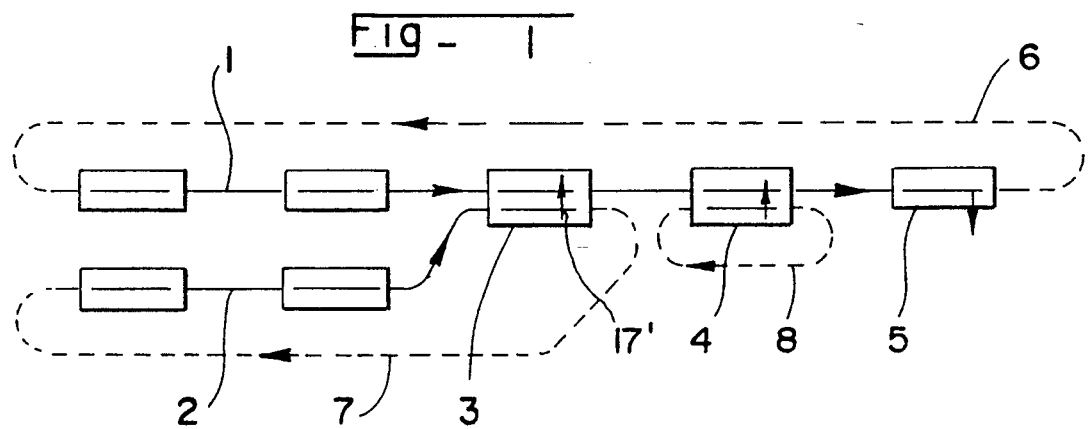
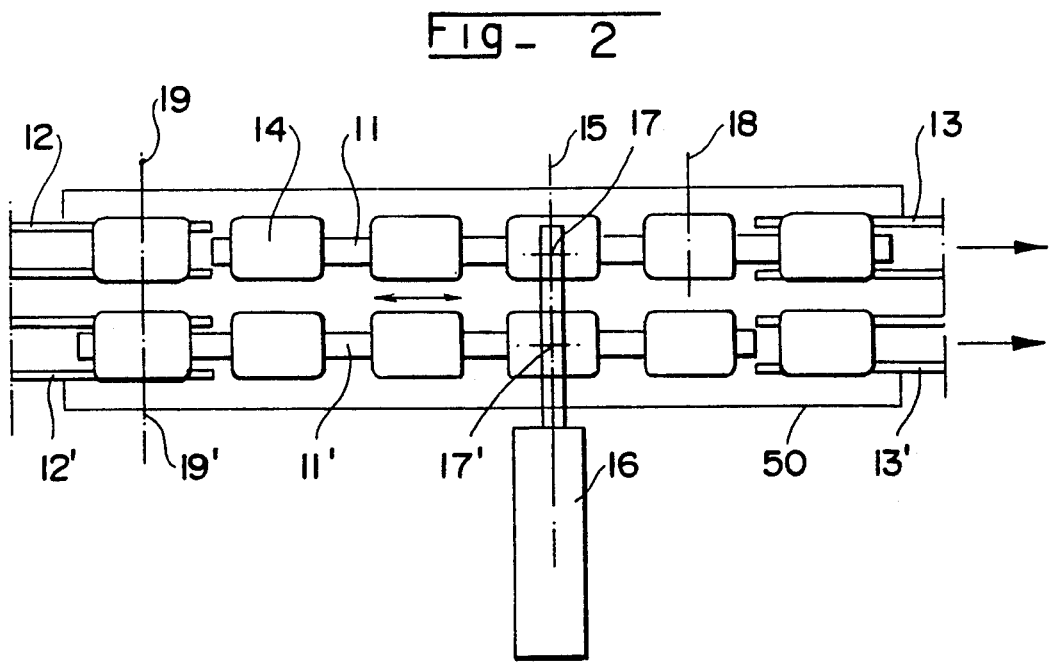

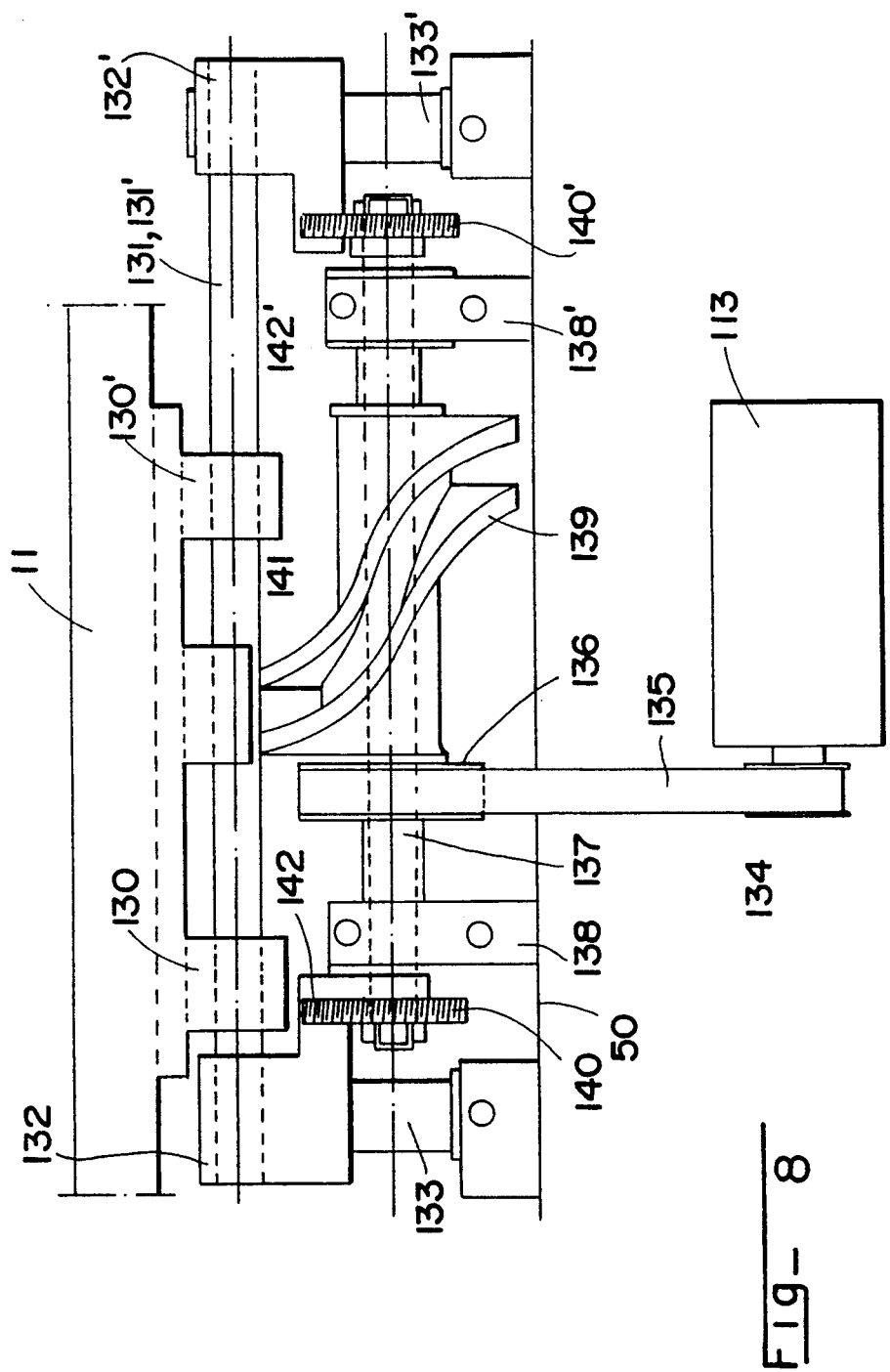

PRODUCTION MACHINE INCORPORATIONG A HIGH-SPEED LIFT AND CARRY DEVICE WITH DOUBLE WALKING BEAM, AND THE PRODUCTION SYSTEM IMPLEMENTING THIS TYPE OF MACHINE

BACKGROUND OF THE INVENTION

The invention relates to a production machine of the kind described in the U.S. patent application 07/413076 of Sept. 27, 1989 now abandoned, which will henceforth be called the "Initial Patent".

The Initial Patent notably describes a walking beam lift and carry device enabling palettes to be presented successively on different workstations. The system is mainly geared to automatic assembly, the palettes acting as support to the product being manufactured, and each workstation corresponding to an operation of the process to be performed (insertion, welding, crimping, checking, etc.). To this end, each station is equipped with a suitable device which will henceforth be designated by the general name "working module".

An essential feature of the type of machine thus achieved is a high degree of flexibility, obtained by equipping each module (lift and carry module and working modules) with individual motorization, synchronization being achieved by electronic control. This control, according to the different situations encountered, enables operating cycles to be set in motion at the level of each module, when this operation is possible and necessary, and enables the module to be left inactive in the opposite case.

Another feature of the machine lies in its linear configuration, which makes it particularly suitable for integration into a production line comprising other machines upline and downline, the link between the machines being easily able to be achieved by conveyor sections which may act a buffer stocks.

The flexibility of operation described in the foregoing paragraph can usefully be taken advantage of :

at the lift and carry module level to subordinate its operation to the fact that certain necessary conditions are correctly met :

upline feed (presence of a palette against the machine input stop)

no downline blocking (no accumulation beyond a certain critical point on the downline conveyor)

ability of the working modules to fulfill their function at the working module level, to adapt the machine to the different versions of the product to be manufactured, by rendering such or such a module active or inactive depending on the version involved (the latter being automatically identified by reading of a coding at the machine input).

Thus described by the Initial Patent, a machine of this kind is suited to integration in a system with a strictly linear configuration, i.e. starting from an empty palette on which the product to be manufactured is progressively built up by successive operations. At the end of the process, the finished product is removed from the palette, which is then recycled back to the machine at the head of the line.

In pure theory, such a system could be achieved by a single machine presenting the required number of workstations. In practice, this number is generally such that several machines have to be placed in series linked by conveyor devices, as described above.

A linear system of this kind can be advantageously used whenever the range of operations to be carried out permits, which is not always the case. Certain constraints may in fact arise, notably in the assembly field, which cannot always be met by the linear configuration :

A product incorporating distinctly individualized sub-assemblies, each sub-assembly having to be subjected to a very specific process before being incorporated in the main product. The production line then becomes tree-structured (in the same way as the range), i.e. it is composed of a main line leading to the finished product, and of one or more branch lines, each of these lines being dedicated to a given sub-assembly.

The presence of operations which, for technical reasons, cannot be carried out on the palettes conveying the main product (for example, shaping or welding operations which absolutely must be performed before insertion in the main product for reasons of accessibility or pollution).

The object of the type of machine involved in the present invention is to solve the problems set out above. We will first of all examine the first one, and will see that the second one is no more than a particular case.

When a sub-assembly is manufactured on a branch line, the latter may be equipped with conventional machines, depending on the operations to be carried out. But it must end with a special machine, which is common with the main line, and whose essential function is to transfer the finished sub-assembly to the main product being manufactured. Such a machine will henceforth be designated "convergence station". On the main line, it can occupy any position (generally along the line, but it may be at the head or at the end of the line in certain cases). On the branch line, it must occupy the end-of-line position, i.e. the corresponding palettes leave it empty and are recycled to the machine at the head of the branch line.

SUMMARY OF THE INVENTION

According to a first embodiment of the invention, a convergence station is characterized by the presence of two walking beam lift and carry devices disposed parallel to one another and operating in opposition (when one lifts upline, the other carries downline, and vice-versa). The two devices are therefore mechanically distinct, as far as the cam kinematics are concerned, their motorization on the other hand being able to be common, if this provides an advantage in simplicity.

One of the devices incorporated in the main line, and the other in the branch line, will be designated respectively by "main track" and "branch track".

The machine must naturally be completed by a transfer handling unit disposed transversely to the lift and carry devices, and operating at the same rate. This handling unit, of the Pick and Place type, picks the sub-assembly up from a palette of the branch line, and places it on the main product, itself carried by a palette of the main track. The synchronization of the assembly must be such that the "Pick" and "Place" operations take place at the right time in the two walking beam cycles. This is moreover the reason why these cycles have to be in opposition.

According to another embodiment of the invention, the two walking beam devices no longer operate in opposition, but in phase. This particularity introduces an important simplification, insofar as a single mechanism is then sufficient for the assembly. However, this gives rise to a problem with the transfer handling unit. As the two tracks are in phase, when the handling unit has performed the "Pick" operation, it has to wait a full cycle of the lift and carry device before performing the "Place" operation (instead of a half-cycle in the previous case). This results in the handling unit having to operate at a rate which is half that of the lift and carry device. As the transfer rate of the sub-assemblies has to be ensured, two consecutive transfer stations consequently have to be disposed operating in parallel, either by fitting two handling units or, more simply, a single handling unit equipped with two gripping heads.

The machines which have just been described are limited to the transfer function, which is the essential function of a convergence station. Yet as the transfer proper only occupies a small longitudinal space, it is obvious that such a machine can, according to requirements, be completed for other operations of the process. On the main track, these operations can be located upline or downline from the transfer. On the branch track, they must be located upline.

A limiting case of a convergence station can thus occur : that where the branch line is reduced to the branch track of the machine itself. There is then no branch machine upline, and recirculation of the empty palettes takes place directly between the upline and downline of the branch track. A machine of this kind will be simply called "double machine", and not convergence station. It is indicated when a sub-assembly has to be produced which requires few operations only, but the latter must be performed away from the main product.

BRIEF DESCRIPTION OF THE DRAWINGS

Other advantages and features will become more clearly apparent from the following description of illustrative embodiments of the invention, given as non-restrictive examples only and represented in the accompanying drawings, in which :

FIG. 1 is a block diagram of a tree-structured production line, comprising a branch line, a convergence station, and a double machine;

FIG. 2 is a plan view of a convergence station operating according to the principle of the two walking beams in opposition;

FIG. 8 is an elevational view of the operating mechanism.

DESCRIPTION OF THE PREFERRED EMBODIMENT

Figure 3:
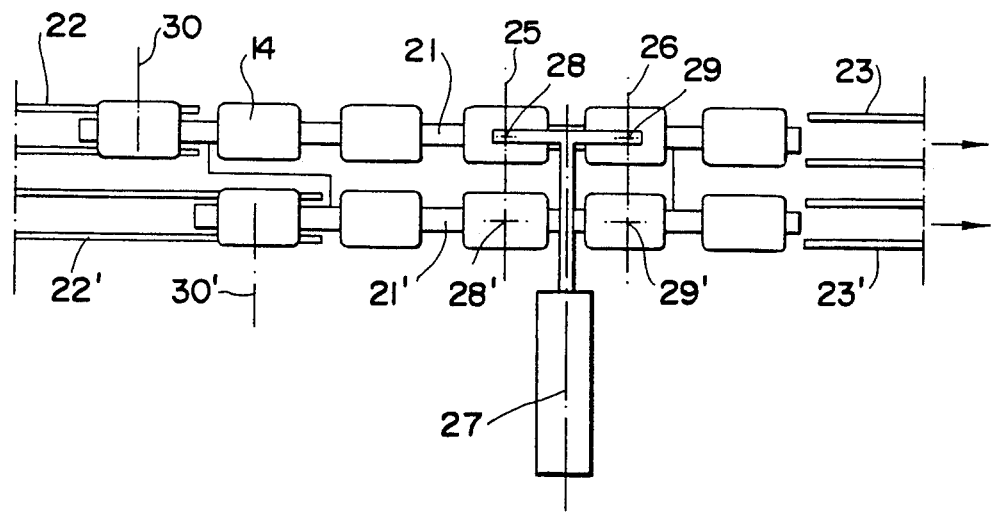
FIG. 3 is a plan view of a convergence station operating according to the principle of the two walking beams in phase.

FIG. 1 represents a manufacturing system comprising a main line 1 and a branch line 2 each comprising a certain number of standalone machines. The junction of these two lines occurs at the level of the convergence station 3, on which both the main and branch lines can be seen, along with the cross-wise arrow representing the transfer of the sub-assembly coming from the branch line.

The machine 4, incorporated in the main line, is a double machine, i.e. it comprises, in addition to its main track, a branch track on which a fairly simple component or sub-assembly is produced, which is transferred to the main track at the station marked by the cross-wise arrow.

The machine 5 being at the end of the line, the cross-wise arrow represents removal of the finished product.

The broken line circuits 6, 7 and 8 represent recirculation of the empty palettes, respectively, of the main line 1, the branch line 2, and between downline and upline of the double machine 4.

FIG. 2 represents a convergence station 3, whose frame 50 is equipped with two walking beams 11 and 11', respectively, of the main track and of the adjacent branch track. For the sake of clarity of the drawing, they are limited to their moving parts, moving in the rectangular cycle, and operating in conjunction with the feed and removal conveyors 12, 13, 12', 13'. The palettes 14 are picked up from the conveyors 12 and 12', and placed on the conveyors 13 and 13', after passing through a certain number of workstations. Among these, the station 15 is equipped with a transfer handling unit 16 arranged to pick the sub-assembly up from the branch line at the point 17', and place it on the main line at the point 17. The next station 18 can be usefully equipped with a control device to check that the sub-assembly has in fact been placed and correctly positioned.

From the operating point of view, the palettes 14 move in the same direction on both tracks, and it has been seen that the two walking beams operate in opposite directions, which is highlighted by FIG. 2 representing the walking beam 11 in the downline position, and the walking beam 11' in the upline position. From this point, a full cycle will run as follows :

Carry phase on the branch track and return phase of the walking beam 11 on the main track. During this phase, the palettes 14 are available on this track for working operations. It is therefore at this moment that the handling unit 16 has to be present at the point 17 to place a sub-assembly.

Vertical movement phase in the course of which the walking beam 11 moves from the down position to the up position, and the walking beam 11' from the up position to the down position. It is approximately during this phase that the handling unit 16 performs its return travel from the point 17 to the point 17'.

Carry phase on the main track and return phase on the branch track. Sub-assembly picked up by the handling unit at the point 17'.

Vertical position inversion phase and transfer of the handling unit from the point 17, and return to the initial situation.

During the cycle described above, it can be seen that the three devices (the two walking beams and the handling unit) have each performed a full cycle. They therefore have to be synchronized at the same rate. The assembly operates so long as the feed takes place normally, i.e. so long as arrival of the palettes at the upline stations 19, 19' is detected, both on the main track and on the branch track. As soon as no palettes are detected on one of these tracks, the assembly stops in a standby position enabling the corresponding walking beam to wait for a palette to arrive.

FIG. 8 illustrates the operating mechanism of a walking beam device with a rule 11 performing a rectangular cycle. The rule 11 is securely united to guide blocks 130, 130' sliding on parallel horizontal rods 131, 131', which form a rigid assembly with the blocks 132, 132', which are themselves guide blocks sliding on vertical rods 133, 133'. The rule 11 therefore has two degrees of freedom in both the horizontal and vertical directions. The drive is provided by the motor 113 (possibly with a reducing-gear incorporated) and is achieved via the pulley 134, the notched belt 135, and the pulley 136 itself wedged onto the camshaft 137, supported by the bearings 138, 138'. The shaft 137 supports the helicoidal cam 139 which generates the horizontal movement and the flat cams 140, 140' which generate the vertical movement (the cams 140, 140' have the same shape; they are only fitted double to provide correct support for the vertical movable assembly 131, 131', 132, 132'). The horizontal cam 139 operates in conjunction with the roller 141 securedly united to the rule 11. It should be noted that the height of this roller and its penetration into the throat of the cam 139 are sufficient to tolerate vertical movement without becoming disunited. The vertical cams 140, 140' operate in conjunction with the rollers 142, 142' securedly united to the blocks 132, 132', the return being ensured by the weight of the moving assembly (which can be reinforced by springs if necessary). As far as the horizontal movement is concerned, the return is provided by the cam itself, which has a dual effect. The rule 11 is controlled by an identical mechanism driven by the same motor 113 or a synchronized motor, the movements being staggered to move the rules 11, 11' in opposition.

In addition to the transfer handling unit 16, the machine can be equipped with other working modules, both on the main track and on the branch track. Depending on the production requirements, activation of these modules can be systematic or not. The same is the case for the transfer module, which can be rendered inactive, and for the whole of the branch line, if certain versions of the product to be manufactured do not comprise the sub-assembly produced on this line.

FIG. 3 represents the second version of the convergence station, in which the two moving walking beam parts 21, 21' are driven with the same movement, and can therefore be mechanically united and driven by the same mechanism according to FIG. 8. As the palette feed and return phases are then synchronized, and the handling unit 27 can only perform an operation on one of the tracks during the return phase, the handling unit 27 therefore has to work alternately performing a "Pick" operation on the branch track during one cycle, and a "Place" operation on the main track during the next cycle. Its operating rate is therefore half that of the walking beam, which explains the necessity of devoting two workstations 25, 26 to the transfer function, and of having two grips operate in parallel, to pick two sub-assemblies up simultaneously from the points 28', 29', and then place them at the points 28, 29.

As far as the upline area of the machine is concerned, it can be noted that the palette loading stations 30, 30' on the feed conveyors 22, 22' have been staggered one step. If this was not done, when restarting after an interruption, the first two palettes would reach the points 28, 28' at the same time, which would enable the sub-assembly to be transferred to be picked up at 28', but would not enable it to be placed at 28. In fact, as placing takes place at the next cycle, the palette involved would no longer be at 28, but at 29, and would therefore not receive a sub-assembly. The above-mentioned staggering enables this drawback to be overcome, by presenting the first palette of the main track at 28 one cycle later than the first palette of the branch track is presented at 28'. The same precaution also enables the version changes of the manufactured product involving both tracks to be controlled correctly.

In a slightly different solution, the stagger can be achieved by leaving the two walking beams the same, and using a retractable stop fitted on the feed conveyor 22, one step upline from the pick-up station of the palettes by the walking beam 21.

Figure 4:
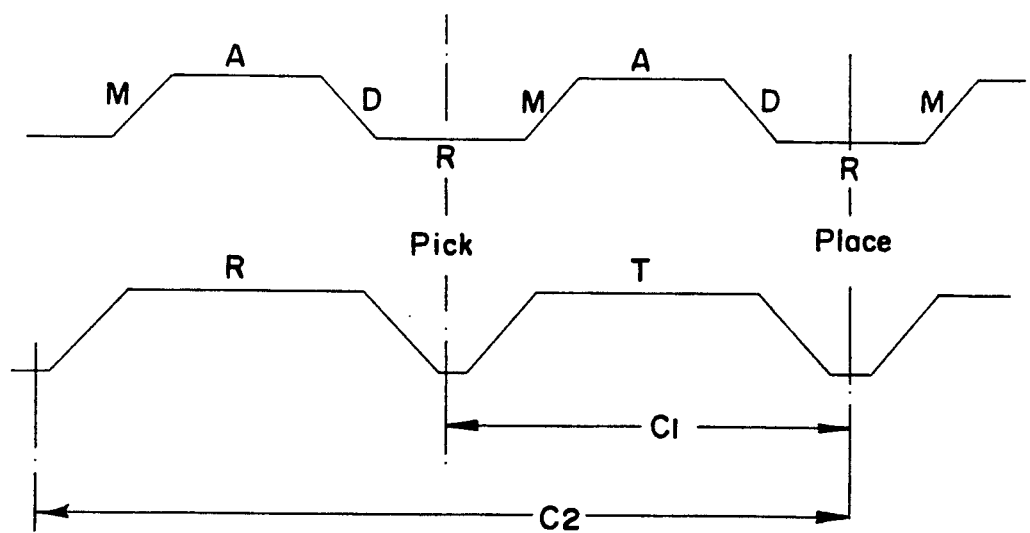
FIG. 4 is a kinematic diagram illustrating the operation of the machine described by FIG. 3.

FIG. 4 illustrates the kinematic operation of the machine described by FIG. 3. The top diagram relates to the walking beam, and positions the 4 phases of the latter in time : carry (A), downward movement (D), return (R) and upward movement (M). The bottom diagram relates to the handling unit 27, which presents the horizontal movement phases : transfer (T) and return (R) between which the active "Pick" and "Place" operations take place. As these operations have to take place during the R phases of the walking beam, it is clear that the handling unit cycle (C2) has to be twice that of the walking beam (C1).

Figure 5:
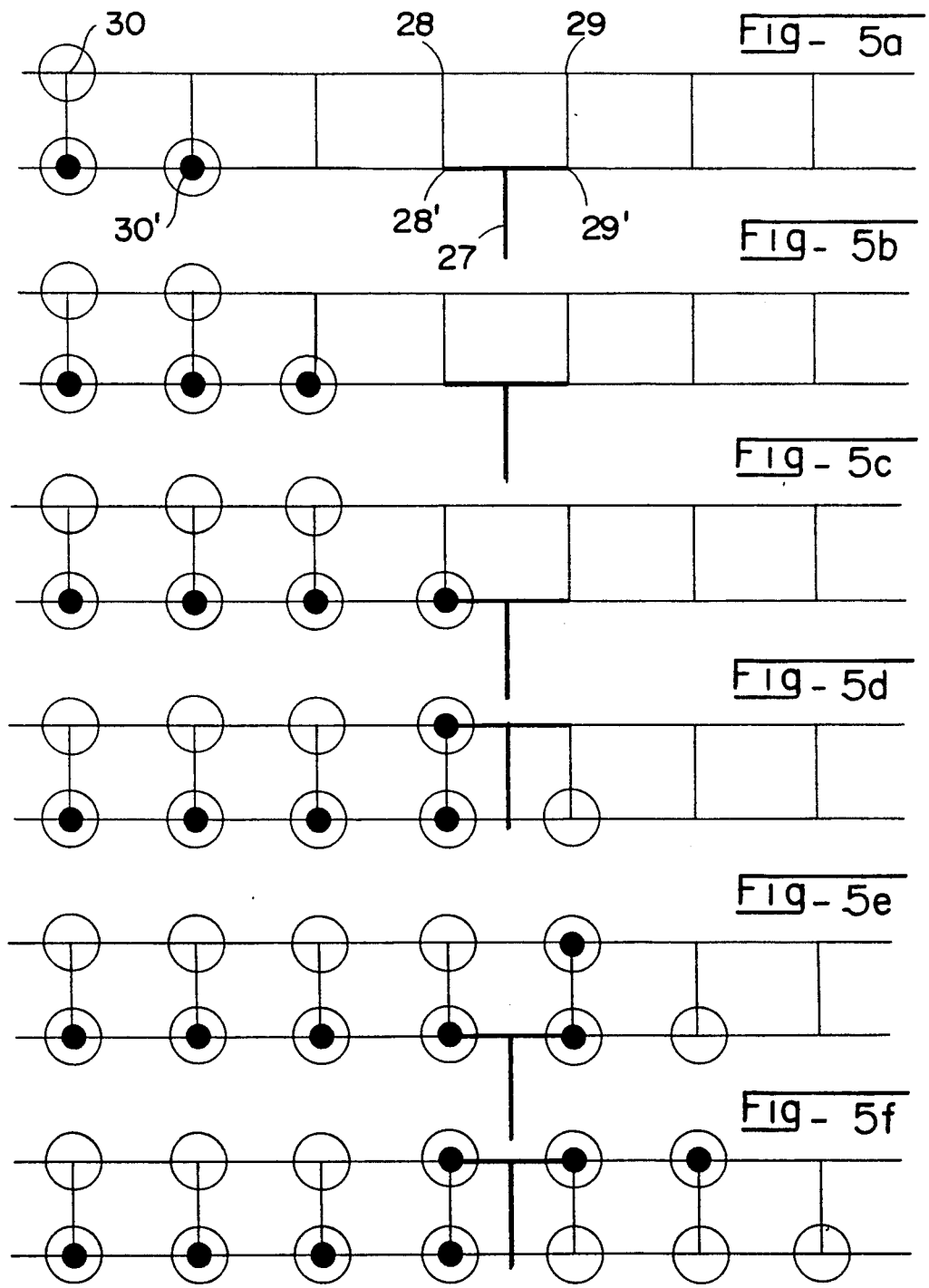
FIGS. 5A–5E is a set of drawings showing the successive positions of the palettes on start-up on the same type of machine.

In FIG. 5, still relating to the same type of machine, 6 successive situations are presented which occur when the machine starts up empty, separated chronologically by intervals corresponding to a cycle C1.

Diagram a : the simultaneous presence of palettes is detected at the input of the main and branch tracks. A palette is represented by a blank disk ; the sub-assembly to be transferred is represented by a smaller black disk. The configuration in the diagram is that of FIG. 3 : input stations 30, 30', and transfer stations 28, 29, 28', 29' administered by the double-grip handling unit 27.

Diagram b : progression one step.

Diagram c : new progression one step.

The handling unit picks a sub-assembly up from 28'.

Diagram d : the handling unit has moved over to the main track. It places the sub-assembly it had picked up from 28' on the station 28, where the first palette of the main track is located at this moment.

Diagram e : the handling unit has returned to the branch track. This time it picks up two sub-assemblies from the stations 28', 29'.

Diagram f : the handling unit is again on the main track where it places the two sub-assemblies at 28, 29, where the second and third palettes of the main track are located, etc.

This process makes the palette transfer system, and the role played by the stagger on input clearly apparent.

A similar scenario could be built up assuming that it is not a start-up that is involved, but a change in the version of the manufactured product. The problem is then to prevent a "hybrid" product from being manufactured incorporating a sub-assembly of a version A in a basic product of a version B. If it is assumed that the palettes represented in FIG. 5 belong to the version B, and that they were preceded by palettes of the version A, it can be seen that this type of mixing will not occur, provided that there is an agreement between the number of palettes per version on the main and branch tracks. If this is not the case, there will at one stage be a disagreement between the versions presented at the input stations 30, 30', a situation which absolutely must be detected by suitable scanning means, and which must be corrected by removing the surplus, which may occur either on the main track or on the branch track. This removal can be performed manually, or, to remain within the spirit of the invention, automatically. If the surplus occurs on the main track, a mechanical removal device of the palettes concerned has to be installed. This device can be placed at any point of the machine, preferably at the output, where it can then also perform the function of removing the palettes rejected for quality reasons, should the machine also comprise one or more checking stations. If the surplus occurs on the branch track, it is also possible to proceed by removal of the palettes concerned, but also, more simply, by fitting a retractable shoot at the placing points 28 or 29, enabling the sub-assemblies picked up by the handling unit 27 to be collected and removed, this shoot being automatically presented when a surplus occurs and retracted during normal working.

This type of problem naturally only arises if the change of version involves both the main and branch lines.

Figure 6:
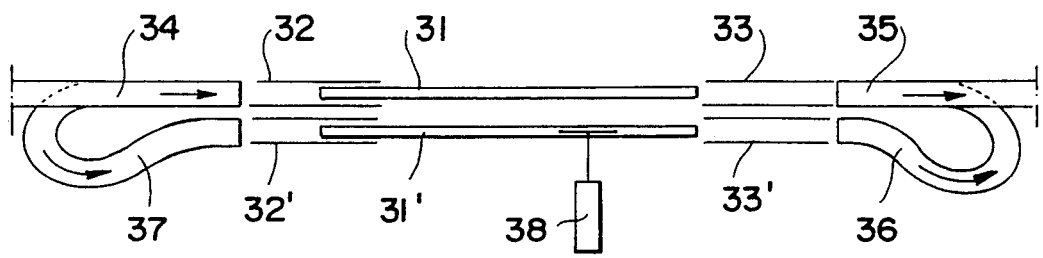
FIG. 6 is a plan view of a double machine showing a palette recirculation principle.

FIG. 6 represents an embodiment of a double machine which, as has been seen, is a limited case where the branch line is limited to the branch track of the convergence station itself, without any other machine upline. The problem specific to this type of machine is to organize the recirculation of the empty palettes between downline and upline of the machine. This recirculation should preferably take place without encroaching on the space taken up by the working modules and their access, which makes the simple solution consisting of a single horizontal loop practically impossible.

In FIG. 6, the walking beams 31, 31', respectively, of the main track and of the branch track, and the upline and downline conveyors 32, 32', 33, 33' can be seen. On the main line, these conveyors are relayed by the conventional conveyors 34 and 35 which belong to the inter-machine transit system. On the branch line, recirculation of the palettes is accomplished by passing under the main track, access to this lower level being achieved for example, by a simple slide 36, the palettes then being taken over by a scale-type conveyor 37 which takes them back upline of the machine, then takes them up to the working surface level to present them upline from the conveyor 32'. In a system of this kind, the quantity of palettes to be put into use must be sufficient to occupy all the workstations of the branch track, plus a small additional quantity calculated so that there is never any wait for a palette at the branch track input. As these palettes return empty, and therefore in a standardized state, there is no problem of agreement at the machine input, and therefore no need for staggering between the two tracks.

As on a conventional convergence station, a transfer handling unit 38 is fitted, generally towards the downline side, to transfer the part or sub-assembly produced on the branch track to the main track. In FIG. 6, this involves a machine with a walking beam in phase, and therefore equipped with a double-grip handling unit, but this machine could just as well be imagined with a walking beam in opposition, in which case it would be equipped with a single-grip handling unit.

Figure 7:
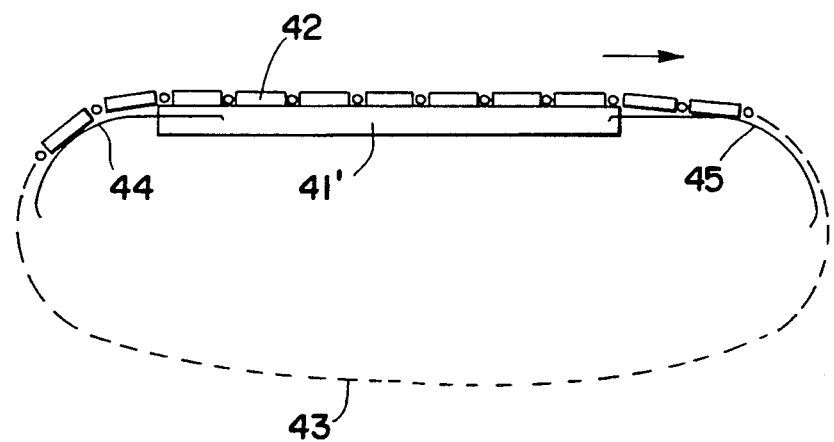
FIG. 7 is an elevational view of a double machine showing another palette recirculation principle.

FIG. 7 illustrates another alternative embodiment of palette recirculation presented according to an elevational view of the branch track. In this alternative embodiment, the palettes 42 are articulated to one another so as to constitute an endless chain 43. The articulations of this chain must have the required precision, but also a certain freedom to allow the normal lift and carry clearance by the walking beam 41'. Upline and downline, the palettes are guided by appropriately shaped slides 44 and 45 which ensure the transition between the active area and the return area. To limit friction, these slides can be replaced by roller ramps.

We claim:

1. An automated conveyorized production apparatus, comprising:
   a conveyorized main track for transporting a plurality of palettes;
   a conveyorized branch track for transporting a plurality of palettes, wherein at least a first segment of said main track and a corresponding second segment of said branch track are adjacent to each other and arranged in parallel, palettes transported across said first segment and said second segment being synchronized to move at the same speed;
   first walking beam lift and carry means forming a part of said first segment for transporting a plurality of palettes along said main track;
   second walking beam lift and carry means forming a part of said second segment for transporting a plurality of palettes along said branch track; and
   transfer handling means disposed at a location along said first segment and said second segment for directly transferring an item from a palette of said branch track disposed on said second lift and carry means to a corresponding palette of said main track disposed on said first lift and carry means before subsequent movement of said corresponding palette along said main track.

2. The apparatus of claim 1, wherein said first lift and carry means and said second lift and carry means operate in opposition.

3. The apparatus of claim 1, wherein said transfer handling means includes a singular gripping means for transporting an item from said branch track to said main track one palette at a time.

4. The apparatus of claim 1, wherein said transfer handling means further comprises N individual gripping means for each gripping and holding an item of a palette during transfer, said N gripping means operating at a rate of $(1/N)$(a rate of each of said main track and said branch track), wherein N is an integer greater than or equal to 2.

5. The apparatus of claim 1, further comprising slide and conveyor means for recycling empty palettes on said branch track by passing said empty palettes in a downstream position under said main track to an upstream position of said branch track.

6. The apparatus of claim 1, wherein palettes on said branch track are arranged in an endless chain enabling the palettes on said branch track to be passed from a downstream position to an upstream position by rotation through a substantially vertical plane.

7. An automated conveyorized production apparatus, comprising:
   a conveyorized main track for transporting a plurality of palettes;
   a conveyorized branch track for transporting a plurality of palettes, wherein at least a first segment of said main track and a corresponding second segment of said branch track are arranged in parallel, palettes transported across said first segment and said second segment being synchronized to move at the same speed;

first walking beam lift and carry means forming a part of said first segment for transporting a plurality of palettes along said main track;

second walking beam lift and carry means forming a part of said second segment for transporting a plurality of palettes along said branch track; and transfer handling means disposed at a location along said first segment and said second segment for transferring an item from a palette of said branch track to a corresponding palette of said main track before subsequent movement of said corresponding palette along said main track, said transfer handling means including means for gripping an item on a palette and operating at a rate of (1/N)(a rate of each of said main track and said branch track), wherein N is an integer greater than or equal to 2.

8. An automated conveyorized production apparatus, comprising:

a conveyorized main track for transporting a plurality of palettes;

a conveyorized branch track for transporting a plurality of palettes, wherein at least a first segment of said main track and a corresponding second segment of said branch track are arranged in parallel, palettes transported across said first segment and said second segment being synchronized to move at the same speed;

first waling beam lift and carry means forming a part of said first segment for transporting a plurality of palettes along said main track;

second walking beam lift and carry means forming a part of said second segment for transporting a plurality of palettes along said branch track;

transfer handling means disposed at a location along said first segment and said second segment for transferring an item from a palette of said branch track to a corresponding palette of said main track before subsequent movement of said corresponding palette along said main track; and slide and conveyor means for recycling empty palettes on said branch track by passing said empty palettes in a downstream position under said main track to an upstream position of said branch track.

9. An automated conveyorized production apparatus, comprising:

a conveyorized main track for transporting a plurality of palettes;

a conveyorized branch track having a plurality of palettes arranged in an endless chain thereon which enables the palettes on said branch track to be passed from a downstream position to an upstream position by rotation through a substantially vertical plane, wherein at least a first segment of said main track and a corresponding second segment of said branch track are arranged in parallel, palettes transported across said first segment and said second segment being synchronized to move at the same speed;

first walking beam lift and carry means forming a part of said first segment for transporting a plurality of palettes along said main track;

second walking beam lift and carry means forming a part of said second segment for transporting a plurality of palettes along said branch track; and transfer handling means disposed at a location along said first segment and said second segment for transferring an item from a palette of said branch track to a corresponding palette of said main track before subsequent movement of said corresponding palette along said main track.

* * * * *